United States Patent [19]

Hutchinson

[11] Patent Number: 4,965,228

[45] Date of Patent: Oct. 23, 1990

[54] GELATION OF ALUMINUM SOLUTIONS USING MAGNESIUM OXIDE

[76] Inventor: Thomas D. Hutchinson, 3513 Rosetta La., Anniston, Ala. 36201

[21] Appl. No.: 391,356

[22] Filed: Aug. 9, 1989

[51] Int. Cl.$^5$ .............................................. B01J 13/00
[52] U.S. Cl. ...................................... 501/12; 501/119; 501/121; 252/315.01; 252/315.6
[58] Field of Search ................. 501/118, 119, 12, 121; 252/315.01, 315.5, 315.6, 315.7

[56] References Cited

U.S. PATENT DOCUMENTS 4,720,302  1/1988  Hutchinson ......................... 106/121

Primary Examiner—William R. Dixon, Jr.
Assistant Examiner—Chris Gallo

[57] ABSTRACT

A process is described for making shaped aggregates by mixing the material to be shaped with an aluminum solution and magnesium oxide. The magnesium oxide provides a delayed but strong gelating action to give time for ramming or casting the aggregate into a viable shape.

2 Claims, No Drawings

GELATION OF ALUMINUM SOLUTIONS USING MAGNESIUM OXIDE

In the manufacture of ceramic shapes, the preferred method of forming is frequently by mixing the ceramic powder with a hydraulic setting agent such as portland cement or calcium aluminate and water. The resultant slurry is poured into a mold to give the required shape. After solidification, which usually exceeds thirty minutes and frequently extends over several hours, the cast aggregate is separated from the mold and is strong enough to retain its shape. There are some disadvantages in the use of hydraulic setting cements as binders for ceramic shapes. One serious drawback is the slow setting time which reduces the rate of production of the cast shapes. Another disadvantage is the necessity of using clay free materials and relatively coarse aggregates thereby eliminating many desirable raw materials and the ability to reproduce very fine detail. A third limitation is that the cements do not have the refractory properties required to produce a cast shape which will withstand the temperatures required in steel making practice or other very high temperature processes. A fourth severe restriction is that cement based compositions cannot be heated rapidly at high temperatures without danger of explosion or violent cracking.

In U.S. Pat. No. 4,720,302 T. D. Hutchinson revealed a solution to these problems and demonstrated a remarkable flexibility in the choice of materials which can be cast to shape using aluminum chloride solutions gelated with magnesium oxide as catalyst. It has now been discovered that other soluble compounds of aluminum such as nitrates, sulfates and acetates can be similarly gelated with magnesium oxide.

The strength of the gelated solutions is dependent upon the concentration of aluminum ions in the solution. The gell strength becomes significant when aluminum ions reach a concentration of 1.5% and at 2%, very strong gells are obtained. When ceramic powders of granular material are mixed in the solution with the magnesium oxide and the resultant slurry is poured into a pattern or retaining form, a rigid aggregate forms after gelation. The pattern or form can be removed immediately for re-use and the shaped aggregate can be handled easily. The aggregate will also retain its shape during subsequent firing at high temperature for further ceramic properties development.

In the tests to be described and throughout this disclosure the percentages cited are by weight with the solvent weight included. For example a 5% solution of aluminum nitrate means that 5 parts by weight of aluminum nitrate are dissolved in 95 parts by weight of solvent. Taking 213 as the formula weight for aluminum nitrate containing 12.7% by weight of aluminum, a 15% solution will contain 1.9% of aluminum ions.

The amount of magnesium oxide needed for complete gelation has been found to be approximately twice the aluminum ion concentration in the solvent. For example if the dissolved aluminum is 2% then 4% magnesium oxide will be required for complete gelation. A lesser amount will form an incipient gel and progressively smaller amounts will only have a thickening action. On the other hand increasing the addition of magnesium oxide over 4% will decrease the gelation time and produce a slightly stronger gell. The gelation time is strongly affected by the reactivity of the magnesium oxide. For example a highly calcined grade in granular form can be made into a thick slurry with a 2% solution of aluminum ions and cast into a viable shape before gelation occurs. With highly reactive grades of magnesium oxide, gelation will occur in a few seconds.

The gelating mechanism described above is not confined to water based solutions. Alcohols and ketones including methanol, ethanol, glycol, glycerol, phenol and acetone have all been gelated by dissolving aluminum compounds and treating with magnesium oxide in the manner revealed in this disclosure.

The essence of this invention is illustrated by the following tests the results of which are shown in Table 1. Three readily available compounds of aluminum, namely aluminum sulfate hydrolysed with sixteen molecules of water, aluminum nitrate hydrolysed with nine molecules of water and anhydrous aluminum acetate were dissolved so that 1.8% of aluminum was in solution. Specifically 22.5 grams of aluminum sulfate were dissolved in 77.5 grams of water, 27 grams of aluminum nitrate in 73 grams of water and 6 grams of aluminum acetate in 94 grams of water. Ten grams of magnesium oxide were stirred into the solution with a ceramic aggregate consisting of two parts by weight of pure silica sand mixed with finely powdered alumina. About six hundred grams of the aggregate were added to give a free flowing slurry. The slurry was cast into a cylindrical mold 2 inches in diameter by 2 inches height. Solidification time after magnesium oxide addition was measured, the gelated aggregate was immediately stripped from the mold and the compression strength tested five minutes later.

TABLE 1

| Solution Type | Gelation Time | G.C.S.psi* |
|---|---|---|
| Aluminum Sulfate | 40 seconds | 16 |
| Aluminum Nitrate | 35 seconds | 17 |
| Aluminum Acetate | 64 seconds | 14 |

In accordance with the above specifications of my invention I make the following claims:

1. The process of making a shaped ceramic aggregate by:
   (a) mixing a solution consisting essentially of; aluminum ions derived from soluble aluminum compounds other than aluminum chloride in a minimum concentration of 1.0%; magnesium oxide in a concentration of at least two times that of the aluminum ions; and a ceramic material in any order or conjointly,
   (b) ramming, casting, or shaping the aggregate in a rigid mold, and
   (c) allowing gelation to take place to form a viable green ceramic shape.

2. The process of forming a rigid gel by mixing a solution of aluminum ions to a concentration of 1.5% or more and mixing magnesium oxide at a level of two or more times the concentration of the aluminum ions.

* * * * *